United States Patent Office 3,060,149
Patented Oct. 23, 1962

1

3,060,149
STABILIZED POLYMER COMPOSITIONS
Aubert Y. Coran, Brentwood, Mo., assignor to Monsanto Chemical Company, St. Louis, Mo., a corporation of Delaware
No Drawing.  Filed Dec. 30, 1957, Ser. No. 705,812
13 Claims.  (Cl. 260—45.8)

This invention relates to new and improved olefin polymer compositions. While the invention relates particularly to polyethylene compositions, it also relates to other olefin polymer compositions, which are hereinafter described in greater detail.

It was known heretofore that ethylene polymers, upon prolonged exposure to sunlight, underwent oxidation and photodegradation reactions which resulted in chemical modifications of the polymeric molecule with a corresponding loss of tensile strength and elongation. To protect such olefin polymers from this degradation, various substances have been added to the polymers during their processing, but as is frequently the case, these added substances tend to have an undesirable effect on the other properties of the polymer. For example, many of these substances tend to impair the electrical properties of the polymer and produce undesirable color effects.

This invention has as an object the provision of new and useful compositions of matter comprising certain normally solid olefin polymers. A further object of this invention is to provide compositions comprising certain normally solid olefin polymers and, particularly, polyethylene compositions which have improved physical stability. Another object is to provide compositions comprising certain normally solid olefin polymers which, in the form of free films, molded articles, fibers, coatings, etc., are stabilized against degradation due to outdoor exposure. Other objects will appear hereinafter.

It has been discovered in accordance with the present invention, that normally solid olefin polymers (described in detail hereinafter) which are stabilized with a dihydroquinoline, i.e. 6-alkoxy-1,2-dihydroquinolines, are outstandingly capable of resisting weathering effects in the presence of strong sunlight for prolonged periods of time. These effects are achieved without the impairment of the other properties of polyethylene and other normally solid olefin polymers, as for example the color, electrical properties, etc.

The compounds which are especially effective in combination with the normally solid olefin polymers according to the present invention are dihydroquinolines of the following structure:

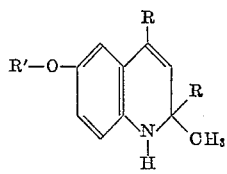

wherein R is hydrogen or an alkyl group having up to four (4) carbon atoms, such as methyl, ethyl, isopropyl, n-propyl, isobutyl, etc., and R' is an alkyl radical having up to ten carbon atoms, such as methyl, ethyl, isopropyl, n-propyl, isobutyl, n-butyl, n-amyl, isoamyl, n-hexyl, n-heptyl, n-octyl, 2-ethylhexyl, nonyl, isodecyl, etc. The preferred 6-alkoxy-1,2-dihydroquinolines are those in which the alkoxy portion has up to four carbon atoms.

The above described 6-alkoxy-1,2-dihydroquinolines may be prepared by methods well known to those skilled in the art. For example, a convenient method of obtaining such compounds is through the condensation of an alkoxy aniline with a ketone. The 6-alkoxy-1,2-dihydroquinoline is separated from the condensation mass by fractional distillation.

The quantity of 6-alkoxy-1,2-dihydroquinoline compound which is employed in the practice of the present invention is generally within the range of about 0.05% to 0.5% by weight of said compound based on the total weight of the normally solid olefin polymer and said compound. Excellent results are obtained when the content of 6-alkoxy-1,2-dihydroquinoline is in the range of from about 0.05% to about 0.1%.

The expression "normally solid olefin polymer" as used herein in the specification and claims shall be understood to refer to any normally solid, aliphatic hydrocarbon polymer of short chain mono-olefins, e.g. polymers of ethylene, propylene, isobutylene, etc., regardless of the process by which it is produced. For example, the commercial polyethylene currently produced by high-pressure processes can be used as well as the high-density ethylene polymers obtained by the newer low-pressure processes, such as the proprietory materials, "Marlex," "Marlex 50," etc., produced by the so-called Ziegler process and other low-pressure processes wherein the so-called Ziegler catalysts are used.

The normally solid olefin polymers used in the compositions of this invention may be copolymers of two or more of the aforementioned normally solid, olefin polymers, especially copolymers of ethylene with minor amounts (from 2 to 10 percent) of higher olefins such as propylene or butylene, and copolymers of one or more short chain mono-olefinic aliphatic hydrocarbon monomers with minor proportions, not to exceed 15% by weight of the olefin, of other ethylenically-unsaturated comonomers such as styrene, vinyl chloride, vinyl acetate, vinyl methyl ether, vinylidene chlorofluoride, methyl methacrylate.

The olefin polymers to which the present invention is applicable must have molecular weights sufficiently high to be normally solid at room temperatures, i.e. above about 5000; preferably, the olefin polymers will have even higher molecular weights, e.g. 20,000 and above. The molecular weights in question are those calculated in the conventional manner on the basis of the viscosity of the polymer in solution, as described in J.A.C.S. 73, page 1901 (1951).

The novel compositions of this invention can be prepared in any suitable manner which will effect thorough and intimate mixing of the polymer and the 6-alkoxy-1,2-dihydroquinoline. This can be accomplished in any machine suitable for mixing solids, as by milling a mixture of the two on hot or cold roll mills as the nature of the polymer permits, by mixing in Banbury mixers or other well known devices of this nature, or it may be mixed with the polymer in the form of molding powder and incorporated during extrusion or during injection molding. Instead of adding the 6-alkoxy-1,2-dihydroquinoline to the polymer in the solid or molten state, it can be added to a solution or suspension of the polymer in an organic solvent, e.g. ethanol, benzene, toluene, xylene, etc., as the particular mixing procedure warrants, which solution may then be employed for the formation of films, for wet or dry spinning of fibers, monofilaments, and the like. The 6-alkoxy-1,2-dihydroquinoline may be added as such or may first be dissolved in a suitable solvent as the particular mixing procedure warrants.

Although the compositions of this invention are composed essentially of normally solid olefin polymers and 6-alkoxy-1,2-dihydroquinoline compounds, small amounts of other materials can also be added. These materials include, for example, fillers, compatible resins, plasticizers, pigments, dyes, lubricants, antistatic agents, other stabilizers, etc. which can be added to modify the compositions for a particular application. The 6-alkoxy-1,2-dihydroquinoline can be incorporated in the polymer composition before, during or after the incorporation of such other materials therein.

The following examples, in which all parts are by weight unless otherwise specified, more fully illustrate the nature of the invention; however, the specific details of these examples are not to be taken as limitations upon the invention:

EXAMPLE I

Preparation of Thin Film

Pellets of DYNH polyethylene (which material has an average molecular weight of about 21,000 and is manufactured by the Bakelite Division of Carbide and Carbon Chemical Company) are mixed with xylene to provide a solution containing 20% polyethylene. The solution is then heated to 130° C. with agitation until complete solution is effected. This solution is then divided into two portions. Into one portion is dissolved an amount of 6-ethoxy-1,2-dihydro-2,2,4-trimethylquinoline, such that the final solution contains 0.1% by weight of said compound based on the total weight of the dihydroquinoline and the polyethylene. The second portion of the above-described solution constitutes the control. Each solution is allowed to stand in an oven heated to 130° C. until all air bubbles disappear, at which time they are each cast over a glass plate, previously heated to 130° C., to form in each case a film approximately 20 mils thick. The film in each case is then air dried at 130° C. and cooled to room temperature. The dried films (approximately 4 mils thick) are then removed from the glass plate and tested as indicated in Example II below.

EXAMPLE II

The Effect of Outdoor Weathering

Film samples prepared as in Example I are simultaneously exposed to St. Louis County, Missouri, summer and fall weather for a period of 150 days. At the end of 100 and 150-day periods, small specimens are cut from each film and tested for strength at break and maximum elongation. The results of these tests with the films, i.e. the modified film and the unmodified or control film, of Example I are set forth in Table A.

TABLE A

| Film of Example 1 | Maximum elongation (percent) | | | Break strength (p.s.i.) | |
|---|---|---|---|---|---|
| | Initial | 100 days | 150 days | Initial | 150 days |
| 1. Control | 650 | 120 | 40 | 2,100 | 1,260 |
| 2. Containing 0.1% by weight of 6-ethoxy-1,2-dihydro-2,2,4-trimethyl quinoline | 560 | 570 | 370 | 1,820 | 1,680 |

The above results indicate qualitatively the stabilizing effect of the 6-ethoxy-1,2-dihydro-2,2,4-trimethylquinoline.

EXAMPLE III

Examples I and II are repeated except that the proportion of 6-ethoxy-1,2-dihydro-2,2,4-trimethylquinoline is varied so as to produce polymer compositions containing 0.05%, 0.075%, 0.2% and 0.5% by weight of the dihydroquinoline compound. Similar results are obtained in that the film containing the lower percentage of the dihydroquinoline essentially exhibits the same elongation and tensile strength properties as the stabilized film of Example II, whereas the films containing the higher percentages of the stabilizer exhibit slightly lower elongation and tensile strength properties.

EXAMPLE IV

Example II is repeated but using, in place of the 6-ethoxy-1,2-dihydro-2,2,4-trimethylquinoline, the following 6-alkoxy-1,2-dihydroquinolines:

(1) 6-methoxy-1,2-dihydro-2,2,4-trimethylquinoline
(2) 6-butoxy-1,2-dihydro-2,2,4-trimethylquinoline
(3) 6-decoxy-1,2-dihydro-2,2,4-trimethylquinoline
(4) 1,2-dihydro-6-isopropoxy-2,2,4-trimethylquinoline
(5) 6-ethoxy-1,2-dihydro-2-ethyl-2,4-dimethylquinoline
(6) 6-ethoxy-1,2-dihydro-2,2-dimethyl-4-propylquinoline
(7) 6-ethoxy-1,2-dihydro-2,4-dibutyl-2-methylquinoline
(8) 6-ethoxy-1,2-dihydro-2-methyl-2,4-dipropylquinoline
(9) 6-ethoxy-1,2-dihydro-2-methylquinoline In each case the 6-alkoxy-1,2-dihydroquinoline exerts a definite stabilizing effect on the polyethylene composition.

While this invention has been described with respect to certain embodiments, it is not so limited, and it is to be understood that variations and modifications thereof can be made without departing from the spirit or scope of the invention.

What is claimed is:

1. A composition of matter comprising a major amount of normally solid polyethylene and a minor amount of a 6-alkoxy-1,2-dihydroquinoline of the structure:

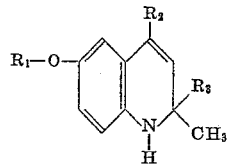

wherein $R_1$ is an alkyl radical having from one to ten carbon atoms and $R_2$ and $R_3$ are selected from the group consisting of hydrogen and alkyl radicals having from one to four carbon atoms.

2. A composition of matter comprising a major amount of a normally solid polymer of ethylene and a minor amount of a 6-alkoxy-1,2-dihydroquinoline of the structure:

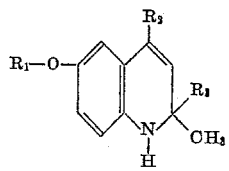

wherein $R_1$, $R_2$ and $R_3$ are alkyl radicals having from 1 to 4 carbon atoms.

3. The method of protecting a normally solid polymer of ethylene against the adverse effects of weather which comprises incorporating therein from about 0.05% to about 0.1% by weight of a 6-alkoxy-1,2-dihydroquinoline of the structure:

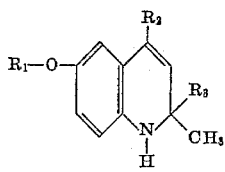

wherein $R_1$, $R_2$ and $R_3$ are alkyl radicals having from one to four carbon atoms, said proportion being based on the total weight of the olefin polymer and the 6-alkoxy-1,2-dihydroquinoline.

4. A composition of matter comprising a major amount of normally solid polyethylene and a minor amount of a 6-alkoxy-1,2-dihydroquinoline of the structure:

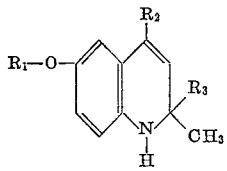

wherein $R_1$, $R_2$ and $R_3$ are alkyl radicals having from one to four carbon atoms.

5. A composition of matter comprising polyethylene having a molecular weight above 20,000 and from 0.05 to 0.1% by weight of a compound of the structure:

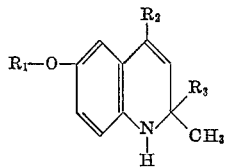

wherein $R_1$, $R_2$ and $R_3$ are alkyl radicals having from one to four carbon atoms, said proportion being based on the total weight of the polyethylene and the 6-alkoxy-1,2-dihydroquinoline.

6. The composition of claim 5 in which the 6-alkoxy-1,2 - dihydroquinoline is 6 - ethoxy - 1,2 - dihydro - 2,2,4-trimethylquinoline.

7. The composition of claim 5 in which the 6-alkoxy-1,2 - dihydroquinoline is 6 - methoxy - 1,2 - dihydro - 2, 2,4-trimethylquinoline.

8. The composition of claim 5 in which the 6-alkoxy-1,2 - dihydroquinoline is 1,2 - dihydro - 6 - isopropoxy - 2, 2,4-trimethylquinoline.

9. The method of protecting normally solid polyethylene against the adverse effects of weather which comprises incorporating therein from about 0.05% to about 0.1% by weight of a 6-alkoxy-1,2-dihydroquinoline of the structure:

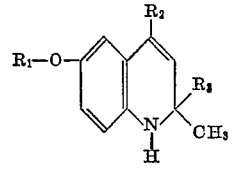

wherein $R_1$, $R_2$ and $R_3$ are alkyl radicals having from one to four carbon atoms, said proportion being based on the total weight of the olefin polymer and the 6-alkoxy-1,2-dihydroquinoline.

10. The method of protecting polyethylene, having a molecular weight above 20,000 against the adverse effects of weather which comprises incorporating therein from about 0.05% to about 0.1% by weight of a compound of the structure:

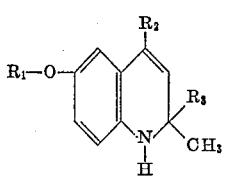

wherein $R_1$, $R_2$ and $R_3$ are alkyl radicals having from one to four carbon atoms, said proportion being based on the total weight of the olefin polymer and the 6-alkoxy-1,2-dihydroquinoline.

11. The method of claim 10 wherein the 6-alkoxy-1,2-dihydroquinoline is 6-ethoxy-1,2-dihydro-2,2,4-trimethylquinoline.

12. The method of claim 10 wherein the 6-alkoxy-1,2-dihydroquinoline is 6-methoxy-1,2-dihydro-2,2,4-trimethylquinoline.

13. The method of claim 10 wherein wherein the 6-alkoxy-1,2-dihydroquinoline is 1,2-dihydro-6-isopropoxy-2,2,4-trimethylquinoline.

References Cited in the file of this patent
UNITED STATES PATENTS

| | | |
|---|---|---|
| 2,748,100 | Harris et al. | May 29, 1956 |
| 2,832,749 | Harris | Apr. 29, 1958 |
| 2,849,452 | Webb | Aug. 26, 1958 |
| 2,852,488 | Clark et al. | Sept. 16, 1958 |
| 2,892,805 | Tomlin et al. | June 30, 1959 |
| 2,941,979 | Pohle et al. | June 21, 1960 |

OTHER REFERENCES

Raff et al.: "Polyethylene" (1956), Interscience Publishers Inc., New York, page 103.